United States Patent
Bean et al.

(10) Patent No.: US 9,731,757 B2
(45) Date of Patent: Aug. 15, 2017

(54) CLOSED LOOP EPAS SYSTEMS

(71) Applicant: Jaguar Land Rover Limited

(72) Inventors: Alex Bean, Coventry (GB); Paolo Pucci, Leamington Spa (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 203 days.

(21) Appl. No.: 14/354,590

(22) PCT Filed: Oct. 29, 2012

(86) PCT No.: PCT/EP2012/071416
§ 371 (c)(1),
(2) Date: Apr. 27, 2014

(87) PCT Pub. No.: WO2013/060897
PCT Pub. Date: May 2, 2013

(65) Prior Publication Data
US 2014/0288778 A1    Sep. 25, 2014

(30) Foreign Application Priority Data
Oct. 27, 2011 (GB) .................................. 1118620.2

(51) Int. Cl.
*B62D 6/08* (2006.01)
*B62D 6/00* (2006.01)

(52) U.S. Cl.
CPC .............. *B62D 6/08* (2013.01); *B62D 6/008* (2013.01)

(58) Field of Classification Search
CPC .................................. B62D 6/08; B60W 30/12
See application file for complete search history.

(56) References Cited

U.S. PATENT DOCUMENTS

| | | | |
|---|---|---|---|
| 5,198,981 A * | 3/1993 | Collier-Hallman .. | B62D 5/0463 180/446 |
| 5,931,256 A * | 8/1999 | Langkamp ........... | B62D 5/0463 180/405 |
| 6,152,254 A * | 11/2000 | Phillips ................ | B62D 5/0463 180/421 |
| 7,513,188 B2 * | 4/2009 | Phillips ................. | B62D 5/065 91/433 |
| 8,249,778 B2 * | 8/2012 | Held ..................... | B62D 6/008 180/443 |

(Continued)

FOREIGN PATENT DOCUMENTS

EP    1431160 A1    6/2004
WO    WO03097428 A1    11/2003

(Continued)

OTHER PUBLICATIONS

International Search Report for application No. PCT/US2012/071416 dated Feb. 4, 2013, 6 pages.

(Continued)

*Primary Examiner* — Tuan C. To
(74) *Attorney, Agent, or Firm* — Reising Ethington P.C.

(57) ABSTRACT

A vehicle comprising a closed-loop electric power assisted steering (EPAS) system comprising a control unit configured to compute an artificial friction component and to compute a desired reference torque ($\tau_{ref}$) incorporating the artificial friction component, wherein the artificial friction component is dependent upon steering wheel angle ($\alpha$).

17 Claims, 5 Drawing Sheets

(56) References Cited

U.S. PATENT DOCUMENTS

| | | | | |
|---|---|---|---|---|
| 8,434,583 B2* | 5/2013 | Wilson-Jones | ...... | B62D 5/0469 180/443 |
| 2001/0053952 A1* | 12/2001 | Kodaka | ................ | B62D 5/0493 701/43 |
| 2003/0014168 A1* | 1/2003 | Williams | ............... | B62D 6/008 701/41 |
| 2003/0051560 A1* | 3/2003 | Ono | ........................ | G01N 19/02 73/862.08 |
| 2005/0005691 A1* | 1/2005 | Ono | ........................ | B60T 8/172 73/146 |
| 2006/0025911 A1* | 2/2006 | Yao | ........................ | B62D 6/008 701/41 |
| 2008/0047775 A1 | 2/2008 | Yamazaki | | |
| 2008/0077308 A1* | 3/2008 | Laubender | .............. | F02N 11/08 701/113 |
| 2009/0157261 A1* | 6/2009 | Yamazaki | ............ | B62D 5/0466 701/42 |
| 2009/0243522 A1* | 10/2009 | Suhama | .................... | B60L 7/16 318/376 |
| 2011/0057510 A1* | 3/2011 | Yamashita | .............. | B60L 1/003 307/10.1 |
| 2011/0218708 A1* | 9/2011 | Ono | ........................ | B62D 6/008 701/42 |
| 2011/0231065 A1 | 9/2011 | Kushiro et al. | | |
| 2012/0081234 A1* | 4/2012 | Shaffer | ................... | G08G 1/167 340/905 |
| 2012/0109466 A1* | 5/2012 | Svensson | ............. | B62D 5/0463 701/42 |
| 2012/0203399 A1* | 8/2012 | Filev | ..................... | B60W 30/02 701/1 |
| 2012/0217083 A1* | 8/2012 | Brickner | ................ | B62D 5/001 180/417 |
| 2012/0253588 A1* | 10/2012 | Ghoneim | ............... | B62D 6/008 701/32.9 |
| 2012/0265403 A1* | 10/2012 | Svensson | ........... | B60K 31/0008 701/41 |
| 2013/0060414 A1* | 3/2013 | Lee | ........................ | B62D 1/286 701/23 |
| 2015/0353127 A1* | 12/2015 | Takeda | ................... | B62D 6/008 701/41 |
| 2016/0229447 A1* | 8/2016 | Wada | .................... | B62D 6/007 |

FOREIGN PATENT DOCUMENTS

| | | |
|---|---|---|
| WO | WO2011002346 A1 | 1/2011 |
| WO | WO2011002347 A1 | 1/2011 |

OTHER PUBLICATIONS

UK Combined Search and Examination Report for corresponding application No. GB 1219435.3, Feb. 23, 2013, 5 pages.

* cited by examiner

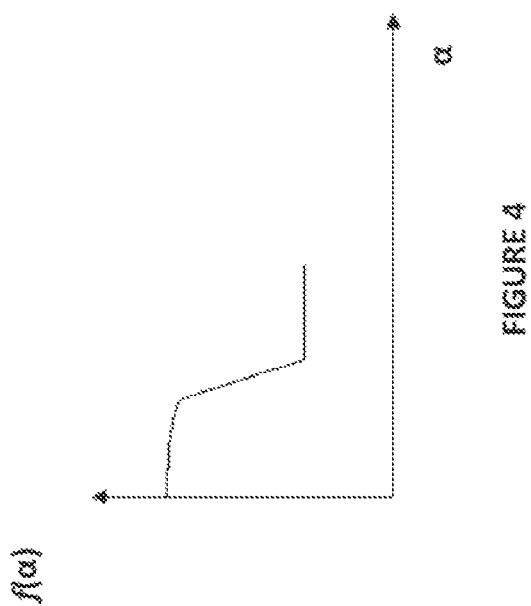

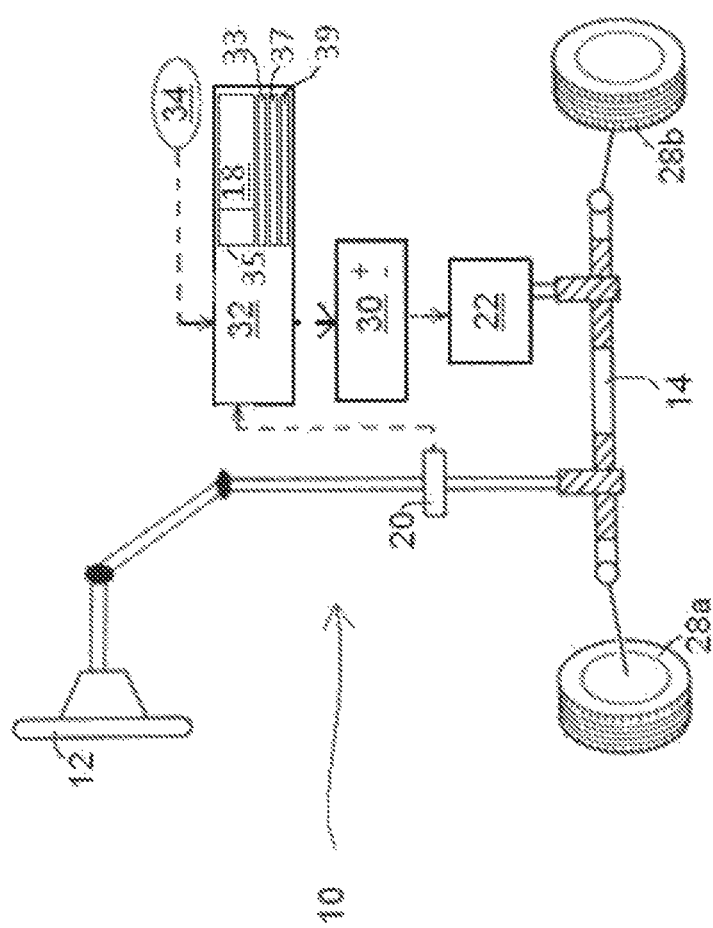

CLOSED LOOP EPAS SYSTEMS

TECHNICAL FIELD

The present disclosure relates to Electric Power Assisted Steering (EPAS or EPS) systems for vehicles such as cars and more specifically but not exclusively to an improvement in closed-loop EPAS systems. Aspects of the invention relate to a vehicle, to a steering system, to a control system, to a program for a computer and to a method.

BACKGROUND

Electric Power Assisted Steering (EPAS or EPS) systems employ an electric motor to assist the driver in providing the amount of torque required to control the direction of the wheels of a vehicle for steering the vehicle. Sensors disposed within the vehicle are used to detect the motion and torque of the steering wheel. A computer module calculates an amount of assistive torque to apply and instructs an electric motor to apply that assistive torque.

In closed-loop EPAS systems a desired driver exerted steering torque (also referred to as reference torque or target torque) is calculated from input parameters and variables. In a closed-loop EPAS system, the actual driver-applied torque is compared to the desired reference driver torque and the electric motor that provides the assistive power is controlled to minimize the difference between the desired reference driver torque and the actual driver applied steering torque. In a closed-loop system the steering characteristics that are experienced by the driver are controlled. A computed desired reference driver torque is typically dependent upon variables such as the vehicle speed, the vehicle direction (forward travel or revere travel) and the steering wheel angle, which are received in real-time.

Such closed loop control systems must artificially synthesise all the desirable elements that make up the steering feel and as such usually comprise dedicated algorithms that are included to generate, among other things, an artificial friction component of the desired reference torque. Those algorithms are needed because the closed loop system, could otherwise completely cancel out the torques due to friction and hysteresis that are normally felt in the steering system and without the artificial friction or artificial hysteresis, the steering characteristics experienced by a driver could feel "artificially clean" and/or could make the steering control task harder for the driver.

One such closed-loop EPAS system is disclosed in WO2010/089172 to ZF Lenksysteme GMBH. In WO '172 it is disclosed that in order to implement a steering feel having a control concept such that it can be adapted to different steering systems, a target steering torque (torTB) is computed as a function of: a base steering torque (torB), a damping torque (torD), a hysteresis torque (torF) and a centring torque (torCF; torC). The base steering torque (torB) is determined as a function of a force acting externally (torR) and a vehicle speed (velV). The damping torque (torD) is determined as a function of the steering speed (anvSW) and the vehicle speed (velV). The hysteresis torque (torF) is determined as a function of the steering speed (anvSW) and the vehicle speed (velV). The centring torque (torCF; torC) in the direction of the straight line position is determined as a function of the steering wheel angle (angSW) and the vehicle speed (velV).

The quality of steering feel is considered by the applicant to be a critical characteristic and it is desirable to refine the steering feel of known closed-loop EPAS systems.

It is an object of the present invention to provide a closed-loop EPAS system and a vehicle comprising the same that exhibits refined or tuned steering characteristics compared to current closed-loop EPAS systems. More, specifically, it is an aim to improve the characteristics of reaction torque. This is because if the driver experiences a good reaction in torque in the steering as soon as the steering wheel is turned, a sense of confidence and a "well connected" feel may be imparted to the driver. This may enhance the driving experience. As such in the EPAS system of the present disclosure, a target steering torque (also referred to as a desired reference torque ($\tau$ref)) is computed that incorporates an hysteresis torque component (also referred to as an artificial friction component) that is dependent upon steering wheel angle ($\alpha$).

SUMMARY OF THE INVENTION

Aspects of the invention provide a vehicle, a steering system, a control system, a program for a computer and a method as claimed in the appended claims.

According to one aspect of the invention, there is provided a vehicle comprising a closed-loop electric power assisted steering (EPAS) system comprising a control unit configured to compute a desired reference torque ($\tau$ref) incorporating an artificial friction component, wherein the artificial friction component is dependent upon steering wheel angle ($\alpha$).

Optionally, the control unit may be configured to receive a plurality of input parameters and/or input variables and may be configured to compute an hysteresis component of the desired reference torque that is dependent upon steering wheel angle and thereby incorporates an artificial friction component into the desired reference torque that is dependent upon steering wheel angle. Optionally the variables are received in real-time such that the desired reference torque is frequently being re-calculated based upon the current steering conditions for comparison with the actual driver torque.

Additionally, or alternatively the control unit may be configured to receive a plurality of input parameters and/or input variables and may be configured tom compute a damping component of the desired reference torque that is dependent upon steering wheel angle and thereby incorporate an artificial friction component into the desired reference torque that is dependent upon steering wheel angle.

Optionally, the control unit is configured to refer to one or more look-up tables, optionally stored in a memory of the control unit, which look-up tables comprise tuning parameters for a range of steering wheel angles and wherein the control unit is configured to reference said look-up tables and use said tuning parameters to determine the artificial friction component (also referred to as hysteresis component) of the desired reference torque ($\tau$ref) such that the artificial friction component is dependent upon steering wheel angle ($\alpha$). Optionally, the values in the look-up table may be interpolated against steering wheel angle using any one of a linear interpolation, a quadratic interpolation, any other polynomial interpolation, an exponential interpolation or any combination of the aforesaid. This may be done in order to obtain a non-listed value that falls between two successive values that are listed in the look-up table.

According to another aspect of the invention, for which protection is sought, there is provided a closed-loop electric power assisted steering (EPAS) system configured to carry out a computation of desired reference torque ($\tau$ref), the computation comprising at least one function to generate an artificial friction component of the desired reference torque and wherein said at least one function for generating the artificial friction component is dependent upon steering wheel angle ($\alpha$).

Yet another aspect of the invention provides a closed-loop EPAS system comprising a control unit which is configured to receive a plurality of input parameters and/or variable signals and is configured to execute a program to compute a desired reference torque ($\tau$ref); that comprises an hysteresis component that is dependent upon steering wheel angle ($\alpha$); that comprises a damping component that is dependent upon steering wheel angle ($\alpha$); or that comprises both a hysteresis component that is dependent upon steering wheel angle ($\alpha$) and a damping component that is dependent upon steering wheel angle ($\alpha$).

Optionally, the control unit is configured to refer to one or more look-up tables, optionally stored by the control unit, which look-up tables comprise tuning parameters for various steering wheel angles and wherein the control unit is configured to reference said look-up tables and to use said tuning parameters in determining the artificial friction component of the desired reference torque ($\tau$ref).

According to another aspect of invention, there is provided a programmable unit that configured to determine a desired reference torque ($\tau$ref) that includes computation of an artificial friction component that is dependent upon steering wheel angle ($\alpha$).

According to yet a further aspect of the invention, there is provided a method of determining a desired reference torque ($\tau$ref) for use in a programmable control unit of a vehicle EPAS system, the method comprising:
(i) collecting data at least relating to vehicle speed steering wheel velocity, driver applied torque and steering wheel angle;
(ii) computing an artificial friction that is dependent upon steering wheel angle;
(iii) computing a desired reference torque based upon at last some of the collected data and said artificial friction.

Optionally, the step of computing an artificial friction comprises determining a functional relationship to use based upon one or more input variables or input parameters received by the control unit and operating that determined functional relationship on the input steering wheel angle signal to compute an intermediate signal that is combined with one or more other intermediate signals that are simultaneously and/or sequentially generated during the computation of the artificial friction and/or hysteresis and for damping.

For example dependent on vehicle speed a specific functional relationship may be selected or computed. Additionally or alternatively, dependent upon a driving mode selected (for example sports mode, towing mode) a different specific functional relationship may be selected. The driving mode may be determined by signal from a control button (activated by a vehicle user (for example an in cabin control button) or may be determined from another sensor within the vehicle.

According to a further aspect of the invention, there is provided, a program for a computerised control unit of an EPAS system, the program when running on the computer is configured to cause the control unit to compute a desired reference torque ($\tau$ref) incorporating an artificial friction component, wherein the artificial friction component is dependent upon steering wheel angle ($\alpha$).

Optionally, the control unit is further configured to receive a plurality of input parameters and input variables and is configured to compute an hysteresis component of the desired reference torque ($\tau$ref) that is dependent upon steering wheel angle ($\alpha$) and thereby incorporate an artificial friction component, that is dependent upon steering wheel angle, into the desired reference torque.

Alternatively or additionally, the control unit is further configured to receive a plurality of input parameters and/or input variables and is configured to compute a damping component of the desired reference torque ($\tau$ref) that is dependent upon steering wheel angle ($\alpha$), thereby incorporating an artificial friction component that is dependent upon steering wheel angle, into the desired reference torque.

Optionally, the control unit is further configured to refer to one or more look-up tables, optionally stored by the control unit, which look-up tables comprise tuning parameters for various steering wheel angles and wherein the control unit is configured to reference said look-up tables and use said tuning parameters in determining the artificial friction component of the desired reference torque ($\tau$ref) such that the artificial friction component is dependent upon steering wheel angle ($\alpha$).

Within the scope of this application it is envisaged that the various aspects, embodiments, examples, features and alternatives set out in the preceding paragraphs and/or in the following description and drawings may be taken independently or in any suitable combination thereof. For example, features described in connection with one embodiment are applicable to all embodiments unless there is incompatibility of features.

BRIEF DESCRIPTION OF THE DRAWINGS

Embodiments of the invention will now be described, by way of example only, with reference to the accompanying drawings, in which:

FIG. 4 is a schematic illustration of a second exemplary function of steering wheel angle that may be used in an algorithm for computing artificial hysteresis; and FIG. 5 is a schematic illustration of a closed-loop EPAS system having a control unit utilising, among others, the algorithm illustrated by FIG. 3.

DETAILED DESCRIPTION OF EXEMPLARY EMBODIMENTS

Figure 1:
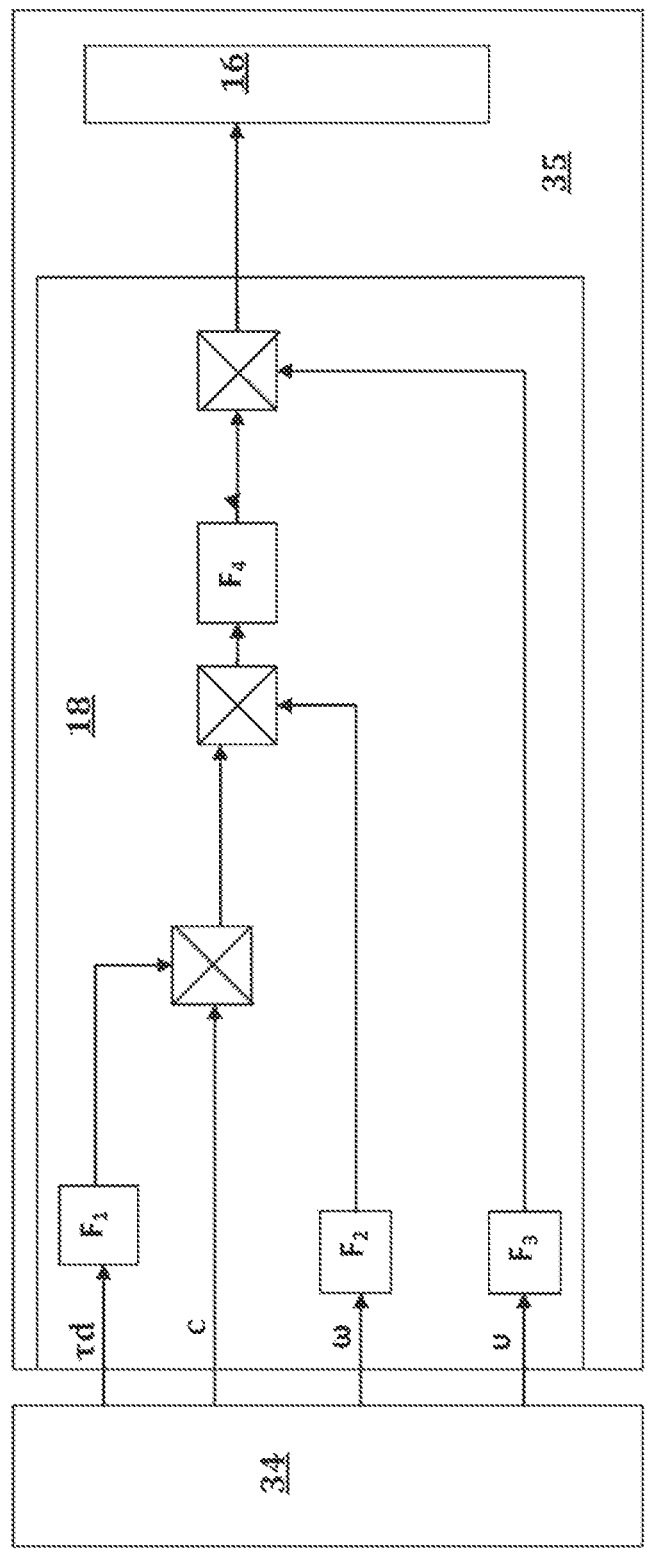
FIG. 1 is a block diagram of at least part of an hysteresis module or algorithm for computing an artificial hysteresis function, usable by a control unit of a closed-loop EPAS system for computing a desired reference torque (the computation of desired reference torque incorporates components in addition to the hysteresis component)

Detailed descriptions of specific embodiments of a vehicle comprising an EPAS system, an EPAS system, a control unit and a method are disclosed herein. It will be understood that the disclosed embodiments are merely examples of the way in which certain aspects of the disclosure can be implemented and do not represent an exhaustive list of all of the ways the disclosure may be embodied. Indeed, it will be understood that a vehicle comprising an EPAS system, an EPAS system, a control unit and a method as described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the disclosure.

In FIG. 5 there is shown a schematic illustration of a vehicle steering system 10. The steering system having a steering wheel 12, coupled via a steering mechanism to a rack 14 which is coupled to the road wheels 28a, 28b that are used for steering the vehicle. A closed loop EPAS system control unit 32, 30 is configured to receive input parameters and variables 34 (and may additionally have parameters and other data stored in a memory for reference). The received variables may include the torque applied by the driver (τd). The torque applied by the driver may be measured (sensed or detected) by a torsion sensor 20, which may take the form of a torsion bar. This and other information, for example vehicle speed (v), steering wheel angle (α) and steering wheel angular velocity (ω), is used by the EPAS system control unit 30 to compute a desired reference torque (τref). The computation is broken down into separate sections which may be visualised as modules. Within the closed loop EPAS system a comparison is made of the actual applied driver torque (τd) and the desired driver torque (τref). A computation of motor applied torque is then carried out by the EPAS system control unit 30 which then instructs the motor 22 to apply a torque in order to more closely align the actual applied torque (τd) with the desired reference torque (τref).

In FIG. 1 there is shown a block diagrammatic illustration of one exemplary module 35 that forms part of a larger algorithm or computation for computing the desired reference torque (τref). In one embodiment the module 35 may be an hysteresis torque module which calculates an hysteresis torque component of the overall desired reference torque (τref) such as a damping torque component. In another embodiment the module 35 may be used for the computation of a different contributory aspect of the desired reference torque (τref). In yet further embodiments, the computation or algorithm for computing a desired reference torque (τref) may be structured differently to that illustrated, it being understood that the schematic illustration is provided to aid the understanding of the EPAS system of the disclosure and that many and various other suitable ways of structuring the computation may be used in other embodiments.

The hysteresis module 35 is provided to impart an "artificial friction" into the steering system to avoid the resultant steering characteristics from feeling artificial and/or from making the vehicle difficult to control. This is because the feedback mechanism of it closed-loop EPAS system can eliminate all frictional effects of the steering system that could otherwise effect the feel of the steering experienced by the driver.

In the illustrated embodiment, the hysteresis module 35 comprises an exemplary algorithm 18 that may be used by a computer or control unit of the closed-loop EPAS system 32 to compute and output an artificial hysteresis signal 16. (The artificial hysteresis signal 16 may also be referred to as an hysteresis signal, an artificial friction signal an hysteresis torque signal, and artificial hysteresis function.) The artificial hysteresis function 16 is incorporated with the outputs of one or more other modules 33, 37, 39 that are each involved in computing the overall desired reference torque (τref). The other modules 33, 37, 39 (or computation sections) may optionally include: a function to generate the basic motor assistance 33; a function to help the self-centring of the steering wheel 37 (also referred to as handle return); and a function to damp the movement of the steering wheel 39. See FIG. 5 for a schematic illustration of the various computation sections or modules 35, 33, 37, 39 which together make up a computation that is utilised by the EPAS system control unit 32 to output a real-time desired reference torque (τref).

The EPAS system control with or central processing unit 32 receives a plurality of inputs 34. These inputs 34 may include both real-time variable signals and static parameter values. Stored parameter values may also be used by the control unit 32 and collectively the real-time (live) data signals and static parameter values are referred to as inputs 34. The inputs 34 may include, but not exclusively, one or more of the following: the dryer applied torque (τd); the steering wheel angular velocity (ω); the vehicle speed (v); and the steering wheel angle (α). The inputs 34 are issued to the modules or computation sections 33, 35, 37, 39. Based upon these inputs 34; the hysteresis module 35; and the one or more other modules 33, 37, 39; a desired reference torque (τref) is calculated or computed. The desired reference torque (τref) is continuously computed.

A selection of the inputs 34 may be input to a specific section or module 33, 35, 37, 39 of the overall algorithm that computes the desired reference torque (τref). For example, the variables and parameters 34 may be input directly to an algorithm 18 or computation section 18 of the hysteresis module 35 (as illustrated in FIG. 1). In the present disclosure, the selection of input variable signals and parameter values 34 for the hysteresis module optionally includes, for example, the real time sensed (in other words measured or otherwise detected or derived) values of changing variables such as driver applied torque (rd); steering wheel angular velocity (ω); and vehicle speed (v). Additionally, parameter values such as one or more tuneable constants c may additionally be input to the algorithm or computation section 18). An hysteresis torque signal 16, which is useable (along with other factors) to compute the desired reference torque (τref) that the driver should feel, is optionally computed by a series of filters and functions applied to the selected input variables and parameters 34.

For the purposes of illustration only, it is shown in FIG. 1 how the steering torque or driver applied torque (τd) is passed through a filter $F_1$ (optionally, a high-pass filter may be used but in other envisaged embodiments the filter may take a variety of formats) before being multiplied by (in this example) by a constant c. The resulting signal is optionally multiplied (any other means for computing the product may be used) by the steering wheel angular velocity (ω) and/or optionally a non-linear windowing function applied to the steering wheel angle speed which may also have been filtered or subject to any other manipulating function $F_2$, (for example a band-stop filter). Similarly the other input variable signals such as vehicle speed and optionally others may be filtered or otherwise processed and multiplied by the outputs of the other functions to generate an output hysteresis torque signal 16 as shown.

Advantageously, the hysteresis module 35 of the present embodiment comprises a function that introduces a dependency upon the steering wheel angle ($\alpha$). In other embodiments of the invention an artificial friction, the magnitude of which is dependent upon the angle of the steering wheel angle ($\alpha$) is incorporated into a different module of the algorithm used to compute the overall desired reference torque ($\tau$ref). Irrespective of the specific order or arrangement of computation, the present disclosure nevertheless provides for an artificial friction component to now be dependent upon steering wheel angle ($\alpha$), such that the overall desired reference torque ($\tau$ref) includes an artificial friction component that is dependent upon steering wheel angle ($\alpha$). Conveniently, the inclusion of an artificial friction component dependent upon steering wheel angle ($\alpha$) may be incorporated into an existing module 35 that is used to compute an hysteresis signal 16.

An advantage of the closed loop EPAS system of the present invention is that the steering characteristics exhibited have the potential to feel more realistic.

Figure 2:
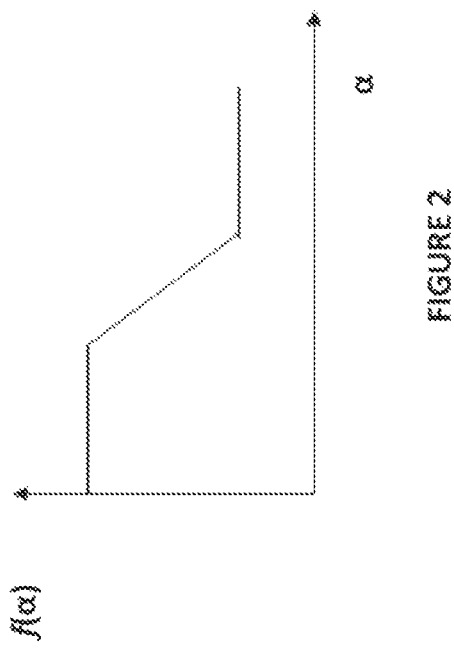
FIG. 2 is a schematic illustration of an exemplary function having a dependency upon steering wheel angle that may be incorporated into an hysteresis module according to an embodiment of the invention in order to incorporate an artificial friction that is dependent upon steering wheel angle.

In an optional embodiment, a filter (or tuning map) is used, that effectively alters the characteristics of the artificial friction. The filter (or other tuning map or function) is optionally shaped such that it allows a high enough friction torque (often referred to as an immediate reaction torque) from straight ahead driving to impart a "connected" feel, but then ramps down the introduced artificial friction with increasing steering angle ($\alpha$) such that the friction feel is not excessive whilst cornering. The impact of introducing an artificial friction that is dependent upon steering wheel angle ($\alpha$) is that the computed desired reference torque ($\tau$ref) may therefore be reduced at higher steering wheel angles ($\alpha$) (in other words, in a cornering situation). In FIG. 2, there is shown schematically, one exemplary tuning map or filtering function $f(\alpha)$ that is incorporated into the hysteresis component/module 35 of a closed-loop EPAS control unit 30 in an embodiment.

Figure 3:
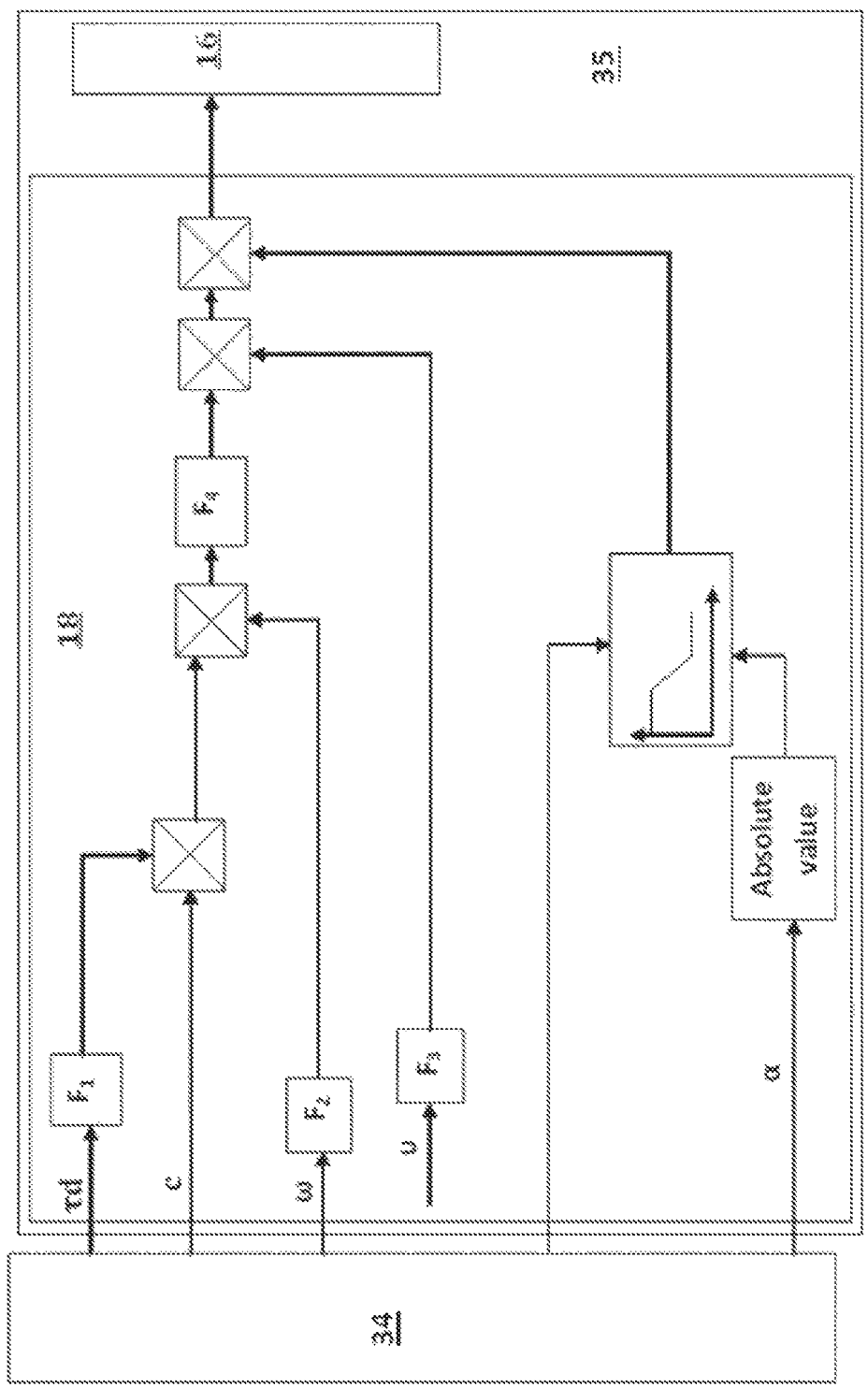
FIG. 3 is a block diagram of at least part of an hysteresis module or algorithm for computing artificial hysteresis incorporating the exemplary function of FIG. 2 such that the artificial hysteresis computed by the algorithm is dependent upon steering wheel angle.

An optional manner in which the steering angle tuning map can be generated and incorporated into the output desired reference torque ($\tau$ref) is illustrated in FIG. 3. Data received as an input variable 34 (for example, from a steering wheel angle sensor) is optionally converted into an absolute value of steering wheel angle ($\alpha$). (The accuracy of the steering wheel angle value ($\alpha$) may not be critical and a resolution in the steering angle value ($\alpha$) in the region of about ±0.01 (degrees) to about ±1.5 (degrees) is optionally sufficient for many embodiments). A tuning characteristic $f(\alpha)$ is optionally generated based upon input variables and/or parameters 34 or alternatively a tuning characteristic $f(\alpha)$ may be selected from a pre-determined set of tuning maps. The decisions as to which map should be selected may optionally depend upon one or more of the input variables or parameters 34. For example, at a higher vehicle speed, a different function for operating on the steering wheel angle signal may be used compared to at lower vehicle speeds. An intermediate output of the hysteresis module 35 may be multiplied by the new tuning characteristic $f(\alpha)$. The overall output hysteresis signal 16, (which has now been made dependent upon steering wheel angle ($\alpha$)) is incorporated into an overall computation of desired reference torque ($\tau$ref) by a programmable control unit 30 of the EPAS system 10.

Referring to the exemplary filtering function of steering wheel angle, $f(\alpha)$ of FIG. 2, it can be seen that for a steering wheel angle ($\alpha$) within a first range (optionally of about 0° C. to about 10°) the function $f(\alpha)$ has a substantially flat characteristic at level 1 (which corresponds to the hysteresis reference torque being fully applied). In a second range (optionally of about 10° to about 30°), the function $f(\alpha)$ gradually ramps down to a third range (optionally from about 30° to a maximum steering angle) within which range the function $f(\alpha)$ exhibits a flat and low, but preferably non-zero, characteristic. This corresponds to the hysteresis reference torque component being only partially applied, in other words the function $f(\alpha)$ operates to reduce the output of the hysteresis module 35. This function $f(\alpha)$, once incorporated into the computation of desired reference torque ($\tau$ref), effects the calculated desired reference torque ($\tau$ref) by adjusting the contribution of artificial friction at certain steering wheel angles ($\alpha$). Thus the desired reference toque ($\tau$ref) used by an EPAS system of the present invention includes an hysteresis component that is now dependent upon steering wheel angle ($\alpha$).

More specifically the $f(\alpha)$ of FIG. 2, may increase or maintain an equal magnitude of the artificial friction component of the desired reference torque ($\tau$ref) within a first steering wheel angle ($\alpha$) range; may cause a gradual and ramping reduction of the artificial friction component of the desired reference torque ($\tau$ref) within a second range; and may cause a significant reduction of the artificial friction component of the desired reference torque ($\tau$ref) in a third steering wheel angle ($\alpha$) range.

In this way, for values of steering wheel angle ($\alpha$) greater than a tuneable threshold (for example a steering wheel angle of 30°), the feel of hysteresis while cornering that would otherwise be present and/or possibly excessive without the invention, is now reduced.

Furthermore, the characteristic of $f(\alpha)$ in FIG. 2 may in some circumstances be tuned to give an increasing and/or decreasing, and/or constant magnitude in each of the three steering angle ($\alpha$) ranges, and/or the magnitude in the third steering wheel angle ($\alpha$) range may be greater than that in the first steering wheel ($\alpha$) angle range. The exact characteristic of $f(\alpha)$ will be such to be in balance with the other functions contributing to the desired reference torque ($\tau$ref).

It will be understood upon reading the foregoing that an algorithm for computing the artificial friction's steering wheel dependency and for computing the hysteresis output 16 may take many and various forms. The order, number and type of computational or processing steps may vary from that described and illustrated without departing from the scope of the present invention. The specific manner in which an artificial friction is incorporated into the algorithm for computing the desired reference torque may take many and various formats and likewise the specific manner in which that artificial friction component is made dependent upon steering wheel angle ($\alpha$) may take many and various forms. In an alternative embodiment, an artificial friction component may be imparted into the computation of desired reference torque ($\tau$ref) by adding additional computation steps into the damping module 39. As such a function dependent upon steering wheel angle ($\alpha$) may be introduced into the damping module 39. This may be in place of any computational steps in the hysteresis module 35 or in addition to the computations steps added into the hysteresis module 35 to impart a steering wheel angle dependency on the artificial friction element included in the calculation of desired reference torque ($\tau$ref).

It will also be understood from the foregoing that there are many and various ways in which the hysteresis torque component used in the computation of the desired reference torque can be made dependent, at least to some degree, upon steering wheel angle. The illustrated function is only an example, and the skilled reader will understand that there are many and various computation techniques suitable for incorporating a relationship with steering wheel angle (α) into the hysteresis torque computation, the damping module 39 and/or any other appropriate aspects of the desired reference torque (τref) computation. The order of the computation illustrated in the block diagram of FIG. 3 is in no way limiting.

Furthermore, the extent to which, the hysteresis component 35, the damping component 39 and/or any other component used to calculate an artificial friction that is used in the computation of the overall desired reference torque (τref), is made dependent upon steering angle (α) is alterable and may also be different for different driving conditions. It will be recognised that one or more functions may be used for computing the desired relationship between hysteresis, damping and/or artificial friction and steering wheel angle (α). It will also be recognised that any suitable order of applying said one or more functions may used in other envisaged embodiments.

In a towing situation for example, there are a number of reasons why it may be disadvantageous to reduce the amount of artificial friction and/or hysteresis or damping at certain steering wheel angles (α). Primarily it may make the driver less mindful of the additional load on the vehicle if the steering characteristic was to feel light despite the load. In this vehicle mode of operation, a towing mode $f(\alpha)$ may be selected for use in the computation of desired reference torque (τref) and/or the algorithm executed by the programmable control unit 30 may be caused to follow a different sequence of operations.

In other embodiments of the invention, multiple tuning maps of functions $f(\alpha)$ are available for selection dependent upon the driving mode, driving conditions and possibly other sensed input parameters.

In other embodiments the steering wheel angle dependency may not be incorporated into the hysteresis aspect 35 of the computation of desired reference torque (τref) by use of a mapped function, but may be incorporated by:

adding a steering angle (α) signal as a direct input to the torque computation section of the hysteresis algorithm;

creating a multiplier signal Ang_mult, processing the steering angle (α) input by means at a look-up table, whose parameters can be tuned, and will typically vary between 0 (feature switched off for that particular angle) and 1 (feature fully switched on for that particular angle); and/or multiplying the original hysteresis torque demand by the multiplier Ang_mult, to scale it to the desired level for that given angle.

Whereas an example of a characteristic of the function $f(\alpha)$ has been provided in FIGS. 2 and 3, in other embodiments of the invention it is envisaged that the characteristic may have a different shape and that more than one function, each optionally having a different shape may be used. For a further, merely illustrative example, see FIG. 4, wherein a second $f(\alpha)$ is shown having a non-flat first region and a steep gradient in the second region. It will be understood that the reference to three regions of steering angle is for the purposes of describing the shape and is not-limiting. For the avoidance of doubt, the function of $f(\alpha)$ used to impart a dependency upon the steering wheel angle (α) may have many and various shapes which may or may not include three identifiable sections.

The invention claimed is:

1. A vehicle comprising a closed-loop electric power assisted steering (EPAS) system comprising a control unit configured to compute a desired reference torque (τref) incorporating a calculated artificial friction component, wherein the magnitude of the calculated artificial friction component is dependent upon and modified by a steering wheel angle (α), and wherein the EPAS system is configured to use the computed desired reference torque (τref) in providing an assistive torque to a steering system of the vehicle.

2. The vehicle according to claim 1 wherein the control unit is configured to receive a plurality of input parameters and input variables and is configured to execute a program to compute an hysteresis component of the desired reference torque (τref) that is dependent upon the steering wheel angle (α) and thereby incorporates said artificial friction component, the magnitude of which is dependent upon the steering wheel angle, into the desired reference torque.

3. The vehicle according to claim 1 wherein the control unit is configured to receive a plurality of input parameters and input variables and is configured to execute a program to compute a damping component of the desired reference torque (τref) that is dependent upon the steering wheel angle (α), thereby incorporating the artificial friction component, the magnitude of which is dependent upon the steering wheel angle, into the desired reference torque.

4. The vehicle according to claim 1 wherein the control unit is configured to refer to one or more look-up tables, which look-up tables comprise tuning parameters for various steering wheel angles and wherein the control unit is configured to reference said look-up tables and use said tuning parameters in determining the artificial friction component of the desired reference torque (τref) such that the magnitude of said artificial friction component is dependent upon the steering wheel angle (α).

5. The vehicle according to claim 4 wherein the one or more look-up tables are stored by the control unit.

6. A closed-loop electric power assisted steering (EPAS) system configured to carry out a computation of desired reference torque (τref), the computation comprising at least one function to generate an artificial friction component of the desired reference torque and wherein said at least one function for generating the magnitude of said artificial friction component is dependent upon steering wheel angle (α), and wherein the EPAS system is configured to use the computed desired reference torque (τref) in providing an assistive torque to a steering system of a vehicle.

7. The closed-loop EPAS system according to claim 6 comprising a control unit which is configured to receive a plurality of input parameters and input variables and is configured to execute a program to compute said desired reference torque (τref) that comprises an hysteresis component that is dependent upon the steering wheel angle (α) and/or that comprises a damping component that is dependent upon the steering wheel angle (α).

8. The closed-loop EPAS system according to claim 7 wherein the control unit is configured to refer to one or more look-up tables, which look-up tables comprise tuning parameters for various steering wheel angles and wherein the control unit is configured to reference said look-up tables and use said tuning parameters in determining the artificial friction component of the desired reference torque (τref).

9. The closed-loop EPAS system according to claim 8 wherein the one or more look-up tables are stored by the control unit.

10. A programmable unit for use in the EPAS system according to claim 6 for use in a vehicle, wherein the programmable unit is configured to determine a desired reference torque (τref) that includes computation of a magnitude of said artificial friction component that is dependent upon the steering wheel angle (α).

11. A method of operating a closed-loop EPAS system for a vehicle having a programmable control unit, the method comprising:
(i) collecting data at least relating to vehicle speed, steering wheel velocity, driver applied torque and steering wheel angle;
(ii) computing an artificial friction the magnitude of which is dependent upon a first steering wheel angle range, a second steering wheel angle range, or a third steering wheel angle range, wherein an upper boundary of the second steering wheel angle range is greater than an upper boundary of the first steering wheel angle range and an upper boundary of the third steering wheel angle range is greater than the upper boundary of the second steering wheel angle range;
(iii) computing a desired reference torque ($\tau$ref) based upon the collected data and said artificial friction, wherein the artificial friction is fully applied in the first steering wheel angle range and only partially applied in the second steering wheel angle range and the third steering wheel angle range; and
(iv) instructing a motor of the EPAS system to provide an assistive torque to a steering system of the vehicle based on the computed desired reference torque ($\tau$ref).

12. The method of operating a closed-loop EPAS system for a vehicle according to claim 11 wherein the step of computing an artificial friction comprises determining a functional relationship to use based upon one or more input variables or input parameters received by the control unit and operating that determined functional relationship on the input steering wheel angle signal to compute an intermediate signal that is combined with one or more other intermediate signals that are simultaneously and/or sequentially generated during the computation of a magnitude of the artificial friction.

13. A computerized control unit for an EPAS system, the control unit including a program configured to cause the control unit to compute a desired reference torque ($\tau$ref) incorporating an artificial friction component, wherein the artificial friction component is dependent upon steering wheel angle ($\alpha$), and a predetermined set of tuning maps are used to alter one or more characteristics of the artificial friction component and each of the tuning maps have a different function depending on a value of an input parameter, and further wherein the control unit instructs a motor of the EPAS system to provide an assistive torque to a steering system of a vehicle based on the computed desired reference torque ($\tau$ref).

14. The computerized control unit according to claim 13 wherein the control unit is further configured to receive a plurality of input parameters and input variables and is configured to compute an hysteresis component of the desired reference torque ($\tau$ref) that is dependent upon the steering wheel angle ($\alpha$) and thereby incorporate the artificial friction component, that is dependent upon the steering wheel angle, into the desired reference torque.

15. The computerized control unit according to claim 13 wherein the control unit is further configured to receive a plurality of input parameters and input variables and is configured to compute a damping component of the desired reference torque ($\tau$ref) that is dependent upon the steering wheel angle ($\alpha$), thereby incorporating an artificial friction component into the desired reference torque that is dependent upon the steering wheel angle.

16. The computerized control unit according to claim 13 wherein the control unit is further configured to refer to one or more look-up tables, which look-up tables comprise tuning parameters for various steering wheel angles and wherein the control unit is configured to reference said look-up tables and use said tuning parameters in determining the artificial friction component of the desired reference torque ($\tau$ref) such that the artificial friction component is dependent upon the steering wheel angle ($\alpha$).

17. The computerized control unit according to claim 16 wherein, the one or more look-up tables are stored by the control unit.

* * * * *